US008264400B2

(12) United States Patent
Yapa et al.

(10) Patent No.: US 8,264,400 B2
(45) Date of Patent: Sep. 11, 2012

(54) SIGNATURE MATCHING METHOD AND APPARATUS

(75) Inventors: Nadeeka D. Yapa, Aurora, CO (US); Rachel B. Norman, Long Beach, CA (US)

(73) Assignee: Raytheon Company, Waltham, MA (US)

( * ) Notice: Subject to any disclaimer, the term of this patent is extended or adjusted under 35 U.S.C. 154(b) by 178 days.

(21) Appl. No.: 12/793,049

(22) Filed: Jun. 3, 2010
(Under 37 CFR 1.47)

(65) Prior Publication Data
US 2011/0298650 A1    Dec. 8, 2011

(51) Int. Cl.
*G01S 13/00* (2006.01)
(52) U.S. Cl. ............... 342/90; 342/29; 342/89; 342/95
(58) Field of Classification Search ............. 342/29–40, 342/89–97
See application file for complete search history.

(56) References Cited

U.S. PATENT DOCUMENTS

| | | | | |
|---|---|---|---|---|
| 3,831,174 A * | 8/1974 | King et al. | ...................... | 342/90 |
| 4,533,916 A | 8/1985 | Williams | | |
| 5,077,673 A * | 12/1991 | Brodegard et al. | ........... | 701/301 |
| 5,157,615 A * | 10/1992 | Brodegard et al. | ........... | 701/301 |
| 5,381,140 A * | 1/1995 | Kuroda et al. | ................ | 340/961 |
| 5,406,289 A | 4/1995 | Barker et al. | | |
| 5,477,225 A * | 12/1995 | Young et al. | .................... | 342/46 |
| 5,626,311 A * | 5/1997 | Smith et al. | ................... | 244/3.16 |
| 5,742,706 A * | 4/1998 | Yu | ................................ | 382/229 |
| 5,867,118 A | 2/1999 | McCoy et al. | | |
| 5,947,413 A * | 9/1999 | Mahalanobis | ............... | 244/3.17 |
| 6,081,764 A * | 6/2000 | Varon | ............................ | 701/120 |
| 6,260,759 B1 | 7/2001 | Nguyen et al. | | |
| 6,404,380 B2 | 6/2002 | Poore, Jr. | | |
| 6,462,697 B1 | 10/2002 | Klamer et al. | | |
| 6,542,810 B2 * | 4/2003 | Lai | ................ | 701/120 |
| 6,573,858 B1 * | 6/2003 | Fung et al. | ..................... | 342/36 |
| 6,799,114 B2 * | 9/2004 | Etnyre | ......................... | 701/120 |
| 6,810,322 B2 * | 10/2004 | Lai | ................ | 701/120 |
| 6,828,920 B2 | 12/2004 | Owen et al. | | |
| 6,894,639 B1 | 5/2005 | Katz | | |
| 6,911,933 B1 | 6/2005 | Mutz et al. | | |
| 6,967,616 B2 * | 11/2005 | Etnyre | ......................... | 342/182 |
| 7,026,979 B2 * | 4/2006 | Khosla | ............................ | 342/90 |

(Continued)

OTHER PUBLICATIONS

Ricardo A. Diaz, "Target Recognition Using Linear Classification of High Range Resolution Radar Profiles", Thesis from the Department of the Air Force Air University, Air Force Institute of Technology, Wright-Patterson Air Force Base; Ohio, Mar. 2004.

(Continued)

*Primary Examiner* — Jack W Keith
*Assistant Examiner* — Peter Bythrow
(74) *Attorney, Agent, or Firm* — Pierce Atwood LLP; Joseph M. Maraia

(57) ABSTRACT

Described are computer-based methods and apparatuses, including computer program products, for signature matching. In some examples, the method for signature matching includes receiving a first target profile associated with a first data signal, the first data signal associated with a first target object; receiving a second target profile associated with a second data signal, the second data signal associated with the first target object or a second target object; generating a comparison distance utilizing a comparison distance function and based on a comparison of one or more data points associated with the first target profile and one or more data points associated with the second target profile; and determining a signature matching score based on the comparison distance.

18 Claims, 9 Drawing Sheets

U.S. PATENT DOCUMENTS

| | | | |
|---|---|---|---|
| 7,043,355 B2 * | 5/2006 | Lai | 701/120 |
| 7,116,265 B2 | 10/2006 | Shu et al. | |
| 7,123,192 B2 * | 10/2006 | Smith et al. | 342/455 |
| 7,154,434 B1 | 12/2006 | Sego | |
| 7,205,927 B2 | 4/2007 | Krikorian et al. | |
| 7,218,270 B1 | 5/2007 | Tamburino | |
| 7,259,715 B1 | 8/2007 | Garren et al. | |
| 7,274,801 B2 | 9/2007 | Lee | |
| 7,423,590 B2 * | 9/2008 | Smith | 342/450 |
| 7,456,780 B1 | 11/2008 | Garren | |
| 7,495,612 B2 * | 2/2009 | Smith | 342/450 |
| 7,548,637 B2 | 6/2009 | Xiong et al. | |
| 2002/0008657 A1 | 1/2002 | Poore, Jr. | |
| 2003/0011492 A1 | 1/2003 | Owen et al. | |
| 2003/0097216 A1 * | 5/2003 | Etnyre | 701/120 |
| 2003/0154018 A1 * | 8/2003 | Lai | 701/120 |
| 2005/0231422 A1 * | 10/2005 | Etnyre | 342/182 |
| 2006/0119515 A1 * | 6/2006 | Smith | 342/450 |
| 2007/0222664 A1 * | 9/2007 | Perl | 342/29 |
| 2007/0241954 A1 * | 10/2007 | Hintz | 342/90 |
| 2008/0095312 A1 | 4/2008 | Rodenburg et al. | |

OTHER PUBLICATIONS

Melissa L. Koudelka, John A. Richard, and Mark W. Koch, "Multinomial Pattern Matching for High Range Resolution Radar Profiles", Algorithms for Synthetic Aperture Radar Imaging XIV, Proc. of SPIE, vol. 6568, 2007.

Lang Hong, Shan Cong, Mark T. Pronobis, Stephen Scott, "Wavelets feature aided tracking (WFAT) using GMTI/HRR data", Signal Processing, vol. 86, pp. 2683-2690, 2003.

Richard T. Ivey, Allen M. Waxman, David A. Fay, Daniel P. Martin, "Learn-While-Tracking, Feature Discovery and Fusion of High-Resolution Radar Range Profiles", Proceedings of the Sixth International Conference of Information Fusion, vol. 1, pp. 741-748, 2003.

Jonathon Shlens, "A Tutorial on Principal Component Analysis", Center for Neural Science, New York University, http://www.snl.salk.edu/~shlens/pca.pdf, Apr. 22, 2009.

Matthew S. Crouse, Robert D. Nowak, and Richard G. Baraniuk, "Wavelet-Based Statistical Signal Processing Using Hidden Markov Models", IEEE Transactions on Signal Processing, vol. 46, No. 4, pp. 886-902, Apr. 1998.

Jean-Baptiste Durand, Paulo Goncalves, and Yann Guedon, "Computational Methods for Hidden Markov Tree Models—An Application to Wavelet Trees", https://www-sop.inria.fr/virtualplants/Publications/2004/DGG04a/hmt.pdf, Aug. 26, 2004.

Samuel A. Ellias and Stephen Grossberg, "Pattern Formation, Contrast Control, and Oscillations in the Short Term Memory of Shunting On-Center Off-Surround Networks", Biol. Cybernetics 20, 69-78, 1975.

Salvatore Fazio and Lang Hong, "Using High Range Resolution (HRR) Radar Data for Reconstructing Rigid Moving Target's Scattering Centers", Algorithms for Synthetic Aperture Radar Imagery XI, Proceedings of SPIE vol. 5427, 2004.

* cited by examiner

SIGNATURE MATCHING METHOD AND APPARATUS

FIELD OF THE INVENTION

The present invention relates generally to computer-based methods and apparatuses, including computer program products, for signature matching.

BACKGROUND

Target tracking can be challenging, if not impossible, due to the ambiguity of targets. This ambiguity of the targets occurs when the targets are close to each other or when the sensors (e.g., radars, motion sensors, etc.) tracking the targets cannot distinguish between the targets. Previous attempts at feature-aided tracking require training based on the features of a particular target before the real-time identification or feature-aided tracking of the target. This training requires the extraction of features for the particular target and training of the feature-aided tracking system for that particular target. Other attempts at feature-aided tracking require training of the feature-aided tracking system during a kinematically unambiguous track segment for the target. In other words, the feature-aided tracking system is unable to distinguish between tracks segments until after a period of kinematically unambiguous track segments.

Thus, a need exists in the art for an improved signature matching method and apparatus for a target signature comparison system.

SUMMARY

One approach to signature matching is a method. The method includes receiving a first target profile associated with a first data signal, the first data signal associated with a first target object and receiving a second target profile associated with a second data signal. The second data signal is associated with the first target object or a second target object. The method further includes generating a comparison distance utilizing a comparison distance function and based on a comparison of one or more data points associated with the first target profile and one or more data points associated with the second target profile and determining a signature matching score based on the comparison distance.

Another approach to signature matching is a computer program product. The computer program product is tangibly embodied in an information carrier. The computer program product includes instructions being operable to cause a data processing apparatus to: receive a first target profile associated with a first data signal, the first data signal associated with a first target object; receive a second target profile associated with a second data signal, the second data signal associated with the first target object or a second target object; generate a comparison distance utilizing a comparison distance function and based on a comparison of one or more data points associated with the first target profile and one or more data points associated with the second target profile; and determine a signature matching score based on the comparison distance.

Another approach to signature matching is a system. The system includes a communication module, a distance comparison module, and a signature matching score module. The communication module is configured to receive a first target profile associated with a first data signal, the first data signal associated with a first target object and receive a second target profile associated with a second data signal, the second data signal associated with the first target object or a second target object. The distance comparison module is configured to generate a comparison distance utilizing a comparison distance function and based on a comparison of one or more data points associated with the first target profile and one or more data points associated with the second target profile. The signature matching score module is configured to determine a signature matching score based on the comparison distance.

Another approach to signature matching is a system. The system includes means for receiving a first target profile associated with a first data signal, the first data signal associated with a first target object and means for receiving a second target profile associated with a second data signal, the second data signal associated with the first target object or a second target object. The system includes means for generating a comparison distance utilizing a comparison distance function and based on a comparison of one or more data points associated with the first target profile and one or more data points associated with the second target profile and means for determining a signature matching score based on the comparison distance.

In other examples, any of the approaches above can include one or more of the following features.

In some examples, the determining of the signature matching score based on the comparison distance further includes determining the signature matching score based on the comparison distance and one or more probability density functions associated with the comparison distance function.

In other examples, the determining of the signature matching score further includes generating a ratio based on the comparison distance.

In some examples, the determining of the signature matching score further includes selecting a likelihood ratio based on the ratio determined from the comparison distance. The likelihood ratio is associated with a match probability density function and a mis-match probability density function. The determining of the signature matching score based on the comparison distance further includes determining the signature matching score based on the comparison distance and the selected likelihood ratio.

In other examples, the selected likelihood ratio is calculated in accordance with equation:

$$LR(d) = \frac{g_\Sigma(d)}{g_\Delta(d)}$$

wherein:

$g_\Sigma$ is the match probability density function indicative of a match of the first target profile and the second target profile, $g_\Delta$ is a mis-match probability density function indicative of a mis-match of the first target profile and the second target profile, d is the comparison distance, and LR is the likelihood ratio.

In some examples, the method further includes for each set of two target profiles in a plurality of target profiles, determining a set of match distances between the two target profiles. The method further includes generating a match probability density function based on the comparison distance function and the set of match distances and determining a set of mis-match distances between the two target profiles. The method further includes generating a mis-match probability density function based on the comparison distance function and the set of mis-match distances, generating a scoring function based on the match probability density function and the mis-match probability density function, and storing the scoring function as a set of comparison likelihood ratios. The comparison ratio is indicative of a likelihood of a match or mis-match between the two target profiles.

In other examples, the method further includes determining a data collection angle for a first target profile in the plurality of target profiles and selecting a second target profile in the plurality of target profiles based on the data collection angle.

In some examples, the method further includes generating the match probability density function based on at least a histogram, and/or a kernel density estimation.

In other examples, the method further includes generating the first or the second target profile of the first or the second data signal based on one or more features of the first or the second target object associated with the first or the second data signal.

In some examples, the method further includes associating the first data signal with a previously identified track associated with the second target object based on the signature matching score.

In other examples, the method further includes determining a data collection angle for the first target profile and selecting the second data signal from one or more data signals based on the data collection angle.

In some examples, the first data signal includes a first high range resolution radar data signal, the first target object is associated with a first ground track, and the second data signal includes a second high range resolution radar data signal.

In other examples, the signature matching score is indicative of a match or mis-match between the first target profile and the second target profile.

In some examples, the signature matching score module is further configured to determine the signature matching score based on the comparison distance and one or more probability density functions associated with the comparison distance function.

In other examples, the signature matching score module is further configured to generate a ratio based on the comparison distance function.

In some examples, a likelihood ratio generation module is configured to select a likelihood ratio based on the ratio determined from the comparison distance. The likelihood ratio is associated with a match probability density function and a mis-match probability density function. The signature matching score module is further configured to determine the signature matching score based on the comparison distance function and the selected likelihood ratio.

In other examples, the system further includes a distance comparison module. The distance comparison module is configured to determine a set of match distances between two target profiles in a plurality of target profiles and/or determine a set of mis-match distances between the two target profiles.

In some examples, the system further includes a probability density generation module. The probability density generation module is configured to generate a match probability density function based on the comparison distance function and the set of match distances and/or generate a mis-match probability density function based on the comparison distance function and the set of mis-match distances.

In other examples, the distance comparison module is further configured to generate a scoring function based on the match probability density function and the mis-match probability density function.

In some examples, a storage device is configured to store the scoring function as a set of comparison likelihood ratios, the comparison ratio being indicative of a likelihood of a match or mis-match between the two target profiles.

In other examples, the system further includes an angle selection module. The angle selection module is configured to determine a data collection angle for a first target profile in the plurality of target profiles and select a second target profile in the plurality of target profiles based on the data collection angle.

In some examples, the system further includes a target profile generation module. The target profile generation module is configured to generate the first or the second target profile of the first or the second data signal based on one or more features of the first or the second target object associated with the first or the second data signal.

In other examples, the signature matching score module is configured to associate the first data signal with a previously identified track associated with the second target object based on the signature matching score.

In some examples, the system further includes an angle selection module. The angle selection module is configured to determine a data collection angle for the first target profile and/or select the second data signal from one or more data signals based on the data collection angle.

The signature matching techniques described herein can provide one or more of the following advantages. An advantage to the signature matching is that the comparison of target profiles does not require real-time training for newly, acquired, previously unseen target objects, thereby increasing the performance of the tracking of target objects and reducing the processing overhead associated with the tracking of target objects. Another advantage to the signature matching is that the comparison of target profiles does not require an initial kinematic separation of the target profiles, thereby increasing the effective utilization of the tracking capabilities of the technology by not limiting the technology to kinematically separated target profiles.

An additional advantage to the signature matching is that the comparison of target profiles does not require pre-computed templates and is not limited to only matching target profiles to a target library, thereby increasing the flexibility of the signature matching to both known and unknown target objects and decreasing the setup time for an associated target recognition system, if any. Another advantage to the signature matching is that the output can be a log likelihood ratio score that can provide a degree of evidence of a match versus a mis-match between two target profiles, thereby increasing the effective usefulness of the signature matching by providing a positive, negative, or unsure signature matching score and decreasing the negative effects associated with false positives and false negatives.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
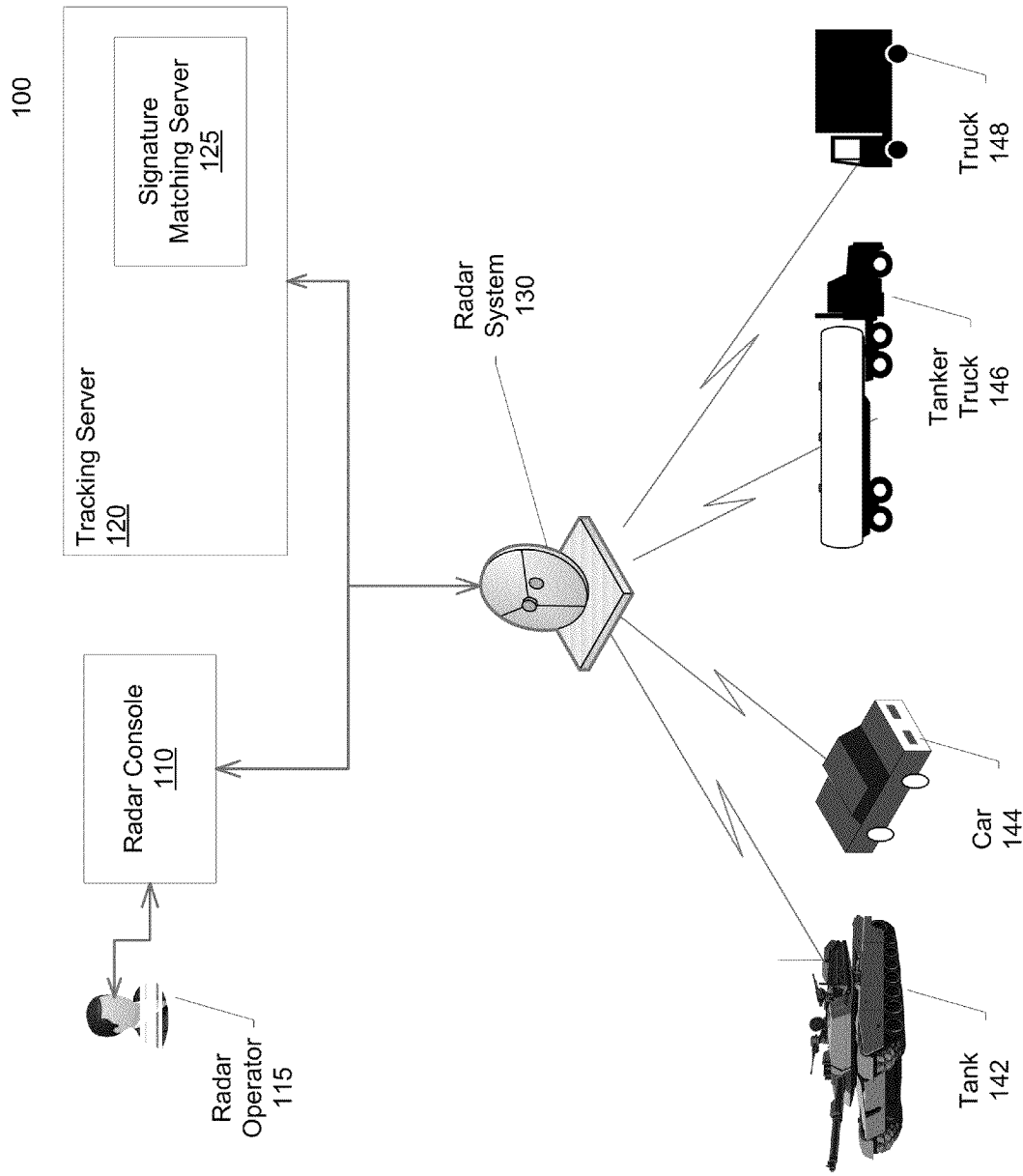
FIG. 1 is a diagram of an exemplary radar tracking system.

The signature matching method and apparatus includes technology that, generally, captures information available in target profiles (e.g., feature data, radar data, pre-processed radar data, etc.) to detect similarities and differences between different views of the same or different target objects (e.g., a civilian vehicle, a military vehicle, a ship, a factory part, a food package, etc.). In other words, for example, the technology scores how well the signature of target profiles match or mis-match against each other. The detection of similarities and differences between different view of the same or different target profiles advantageously enables the generation of a signature matching score (e.g., −10, 0, 0.34, +34, etc.) between the target profiles, which can be utilized to track target objects through kinematically ambiguous and noisy environments (e.g., city streets, airport runways, factory floor, hilly wilderness, closely positioned target objects, densely positioned target objects, etc.), thereby increasing the efficiency of target recognition systems and/or other systems by providing signature matching scores that can distinguish between target objects and/or that target objects are the same.

The technology can be, for example, utilized to track target objects utilizing low dimensional, noisy data signals, thereby increasing the effective uses of the data signal (e.g., 1-Dimensional data, 2-Dimensional data, data from ground-mounted radar system near a border, etc.). The technology can be, for example, utilized for a vehicle tracking system (e.g., border tracking system, military tracking system, airport ground vehicle tracking system, etc.), a quality control system (e.g., manufacturing quality control system, package processing system, etc.), and/or any other type of system that compares target objects (e.g., real-time estimation system, tracker, etc.), thereby increasing the usefulness of low-dimensional data.

The technology can, for example, create a distance comparison that captures the key distinguishing characteristics between feature sets from the same target object versus feature sets from different targets objects. The technology can, for example, generate the comparison distance utilizing a comparison distance function (e.g., pre-determined comparison distance function, dynamically generated comparison distance function, etc.) and a large sampling of feature data from disparate target objects and/or compare distances between target objects utilizing the comparison distance function to form a single score (e.g., the signature matching score) that indicates a probability or likelihood of closeness of the match between target profiles. The signature matching score can be, for example, incorporated into the target recognition system sample by sample (e.g., the comparisons at times 1, 2, 3, and 4 seconds can be individually communicated to the target recognition system and integrated into the confidence of the match/mis-match for a track of a target object).

FIG. 1 is a diagram of an exemplary radar tracking system 100. The system 100 includes a radar console 110, a tracking server 120, a signature matching server 125, and a radar system 130. A user 115 tracks a plurality of target objects utilizing the system 100. The plurality of target objects includes a tank 142, a car 144, a tanker trailer 146, and a truck 148. The radar system 130 transmits electromagnetic waves (e.g., high range resolution radar, synthetic aperture radar, etc.) at the target object and receives reflections of the electromagnetic waves from the target object. The radar system 130 communicates data from the reflections of the electromagnetic waves to the radar console 110, the signature matching server 125, and/or the tracking server 120. The signature matching server 125 determines a signature matching score between target objects and/or target profiles associated with one or more target objects (e.g., data profile of a target object at a particular time, data profile of a target object during a time range, etc.) utilizing the data from the radar system 130 and/or any other information associated with the target objects (e.g., data from a motion sensor, data from a position sensor, etc.). The signature matching server 125 communicates the signature matching score to the tracking server 120, which utilizes the signature matching score to determine tracks for the target objects. The tracking server 120 communicates the tracks for the target objects to the radar console 110 for viewing by the radar operator 115.

In some examples, the tracking server 120 utilizes the signature matching score as input into a tracking algorithm to track a target object (e.g., track a path of a target object through a desert with a plurality of other target objects, track a path of a tank through a forest with a plurality of other target objects, etc.). The tracking server 120 can utilize input from a plurality of other sources to track the track object (e.g., a ground sensor, a motion sensor, an identification friend or foe (IFF) system, etc.).

For example, the system 100 can determine a signature matching score between the tanker truck 146 and the truck 148 at a point in time (e.g., signature matching score of −45 at time +10 seconds, signature matching score of −100 at time +40 seconds). As another example, the signature matching server 125 can determine a signature matching score between a target profile at time 0 seconds and another target profile at time 5 seconds (in this example, the signature matching score is +32, which can indicate that the target profile and the other target profile are the same target object, e.g., the car 144). Table 1 illustrates exemplary signature matching scores between target profiles.

TABLE 1

Exemplary Signature Matching Scores.

| Target Profile 1 | Target Profile 2 | Signature Matching Score |
|---|---|---|
| Tank 142 at time 0.5 seconds | Tank 142 at time 1.2 seconds | +34.10 |
| Tank 142 at time 1.5 seconds | Tank 142 at time 2.0 seconds | +45.32 |
| Truck 148 at time 1.2 seconds | Truck 148 at time 2.3 seconds | +32.32 |
| Tanker Truck 146 at time 1.3 seconds | Truck 148 at time 1.3 seconds | −3.25 |
| Tanker Truck 146 at time 1.8 seconds | Truck 148 at time 1.8 seconds | 0.32 |
| Tank 142 at time 3.4 seconds | Tanker Truck 146 at time 2.6 seconds | −100.32 |

The signature matching score can be, for example, a numerical score, a percentage score, and/or any other type of scoring mechanism (e.g., absolute score, relative score, etc.). In other examples, the signature matching score is a relatively neutral score (e.g., 0, don't know, unknown, etc.). The signature matching score can be advantageously expressed as a likelihood, thereby allowing the score to be utilized by a decision deferred system (e.g., multiple hypothesis tracker, Dempster-Schafer reasoner, etc.), since the signature matching score does not have to be expressed as a match or a mis-match. In some examples, the signature matching score is a match (e.g., 100, "match", etc.) or a mis-match (e.g., 0, −100, "mis-match", etc.).

Although FIG. 1 illustrates one radar console 110, radar operator 115, tracking server 120, signature matching server 125, and radar system 130, the system 100 can include any number of radar consoles, radar operators, tracking servers, signature matching servers, and/or radar systems. For example, the system 100 includes ten radar systems and the ten radar systems communicate data signals to the tracking server 120 for tracking the target objects.

Although FIG. 1 illustrates a plurality of target objects, a tank 142, a car 144, a tanker trailer 146, and a truck 148, the target objects can be of the same or different types. For example, the target objects can be a variety of the same vehicle, e.g., Humvee, Humvee with machine gun, Humvee with satellite, Humvee with high profile tires, etc. As another example, the target objects can be a variety of different vehicles, e.g., Escort, Explorer, Tacoma, etc.

Figure 2:
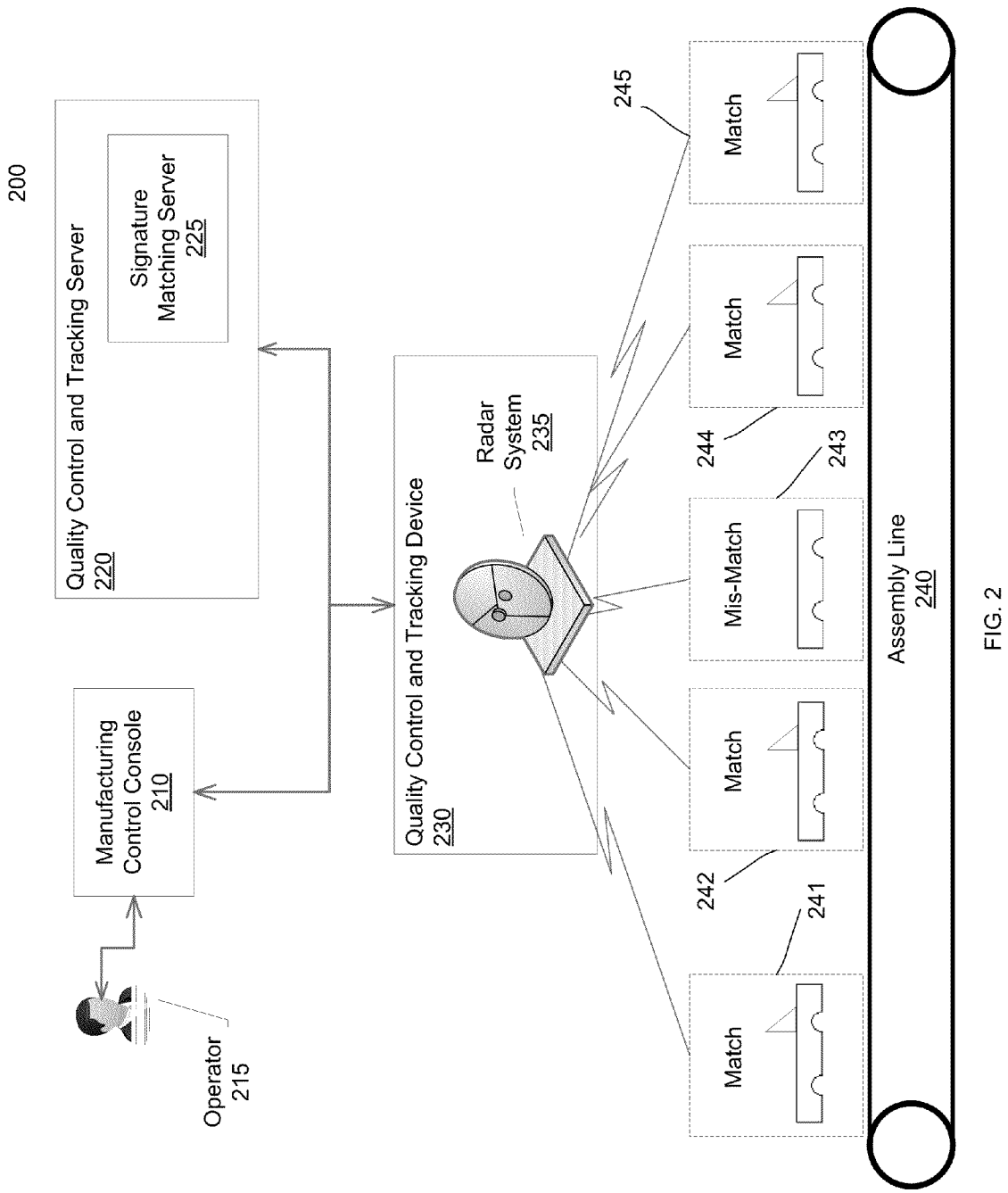
FIG. 2 is a diagram of an exemplary radar manufacturing system.

FIG. 2 is a diagram of an exemplary radar manufacturing system 200. The system 200 includes a manufacturing console 210, a quality control and tracking server 220, a signature matching server 225, a quality control and tracking device 230, a radar system 235, and an assembly line 240. An operator 215 monitors the quality and tracks a plurality of target objects 241, 242, 243, 244, and 245 utilizing the system 200. The radar 230 transmits electromagnetic waves at the target objects and receives reflections of the electromagnetic waves from the target objects. The radar 230 communicates data from the reflections of the electromagnetic waves to the radar console 210, the signature matching server 225, and/or the quality control and tracking server 220. The signature matching server 225 determines a signature matching score between target objects and/or target profiles associated with one or more target objects utilizing the data from the radar 230 and/or any other information associated with the target objects (e.g., data from a motion sensor, data from a position sensor, etc.).

The signature matching server 225 communicates the signature matching score to the quality control and tracking server 220, which utilizes the signature matching score to determine tracks for the target objects and/or quality control information for the target objects (e.g., component is a match, component is a mis-match, invalid component, valid component, etc.). The quality control and tracking server 220 communicates the tracks for the target objects to the manufacturing console 210 for viewing by the operator 215 and advantageously enables the operator 215 to quickly and accurately determine if the target objects are ok or not ok, thereby increasing the efficiency of the assembly line 240 by reducing unacceptable/incorrect/broken components.

In other examples, the quality control and tracking server 220 and/or the operator 215 receives information from other sensors (e.g., electro-optic sensor, video camera, microphone, etc.) and combines the information from the other sensors with the tracks to determine if the target objects are ok or not ok. In this example, the quality control and tracking server 220 combines the signature matching score with information from other sensors to determine a component score. In this example, if the component score is above or below a pre-determined or a dynamically determined threshold, the quality control and tracking server 220 notifies the operator 215 of the component score.

For example, the system 200 can determine a signature matching score between the target object 241 and the target object 242 at a point in time (e.g., signature matching score of −45 at time +10 seconds, signature matching score of −100 at time +40 seconds). As another example, the signature matching server 225 can determine a signature matching score between the target profile 243 at time 0 seconds and another target profile at time 5 seconds (in this example, the signature matching score is +32, which can be indicative that the target profile and the other target profile are the same target).

Although FIG. 2 illustrates one manufacturing console 210, operator 215, quality control and tracking server 220, signature matching server 225, and radar system 235, the system 200 can include any number of radar consoles, radar operators, quality control and tracking servers, signature matching servers, and/or radar systems. For example, the system 200 includes ten radar systems and the ten radar systems communicate data signals to the quality control and tracking server 220 for tracking the target objects.

Figure 3:
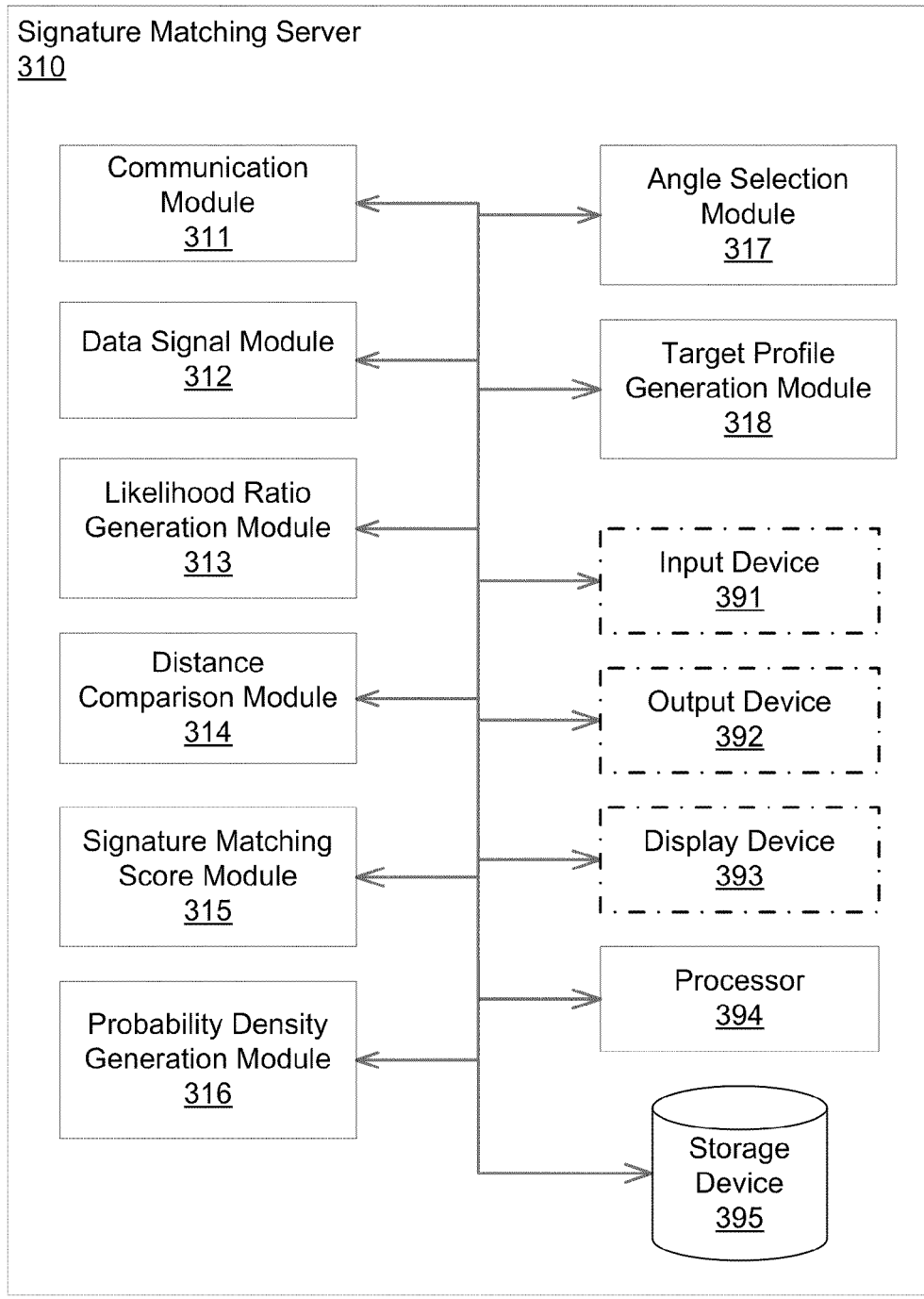
FIG. 3 is a diagram of an exemplary signature matching server.

FIG. 3 is a diagram of an exemplary signature matching server 310. The signature matching server 310 includes a communication module 311, a data signal module 312, a likelihood ratio generation module 313, a distance comparison module 314, a signature matching score module 315, a probability density generation module 316, an angle selection module 317, a target profile generation module 318, an input device 391, an output device 392, a display device 393, a processor 394, and a storage device. The modules and devices described herein can, for example, utilize the processor 394 to execute computer executable instructions and/or include a processor to execute computer executable instructions (e.g., an encryption processing unit, a field programmable gate array processing unit, etc.). It should be understood that the signature matching server 310 can include, for example, other modules, devices, and/or processors known in the art and/or varieties of the illustrated modules, devices, and/or processors.

The communication module 311 communicates information to/from the signature matching server 310. The communication module 311 can receive, for example, a plurality of target profiles (e.g., a first target profile, a second target profile, a third target profile, etc.). Each target profile can be associated with a data signal (e.g., data signal from a radar system, processed data signal from a radar system, data signal from a motion sensor, data signal from an IFF system, etc.). Each data signal can be associated with a target object (e.g., data signal of a truck by a radar system at time 1.5 seconds, data signal of a truck by a radar system at time 4.5 seconds, etc.). In some examples, a plurality of data signals are associated with the same target object (e.g., the first and the second data signal are associated with a first target object, data signals A-Z are associated with a target object, etc.). Table 2 illustrates exemplary target profiles.

TABLE 2

Exemplary Target Profiles.

| Target Profile | Target Object | Data Signal | Time |
|---|---|---|---|
| A234 | Tank 142 | HRR | +3.44 seconds |
| A235 | Tank 142 | HRR | +3.44 seconds |
| B435 | Truck 148 | Motion Sensor A3 | +4.32 seconds |
| A236 | Tank 142 | HRR | +4.52 seconds |
| A237 | Truck 148 | HRR | +5.34 seconds |
| B436 | Tank 142 | Motion Sensor A3 | +5.45 seconds |

The data signal module 312 generates a target profile based on a data signal. In some examples, the communication module 311 receives a data signal (e.g., high resolution radar signal (HRR), sensor data, etc.). The data signal module 312 can generate a target profile based on the received data signal (e.g., convert the data in the received data signal into a digital representation of the received data signal, process the received data signal to form a statistical form of the received data signal, convert analog radar signal into digital radar signal, etc.).

The likelihood ratio generation module 313 selects a likelihood ratio based on the ratio determined from the comparison distance (e.g., log ratio of target profiles, log ratio of distances between target profiles, etc.) as, for example, described below with reference to FIGS. 5A, 5B, 5C, 6, and 7. For example, the likelihood ratio generation module 313 queries a database to obtain the likelihood ratio that corresponds to the ratio determined from the comparison distance (e.g., log ratio, number, etc.). The likelihood ratio can be associated, for example, with a match probability density function and a mis-match probability density function.

The distance comparison module 314 can determine a set of match or mis-match distances between two target profiles in a plurality of target profiles. The distance comparison module 314 can generate a scoring function based on the match probability density function and the mis-match probability density function. The distance comparison module 314 can generate a comparison distance utilizing a comparison distance function (e.g., user-defined comparison distance function, dynamically selected from a plurality of comparison distance functions, etc.) and based on a comparison of one or more data points associated with the first target profile and one or more data points associated with the second target profile.

The signature matching score module 315 determines a signature matching score based on the comparison distance. The signature matching score module 315 can determine the signature matching score based on the comparison distance and one or more probability density functions associated with the comparison distance function. The signature matching score module 315 can generate a ratio based on the comparison distance function. The signature matching score module 315 can determine the signature matching score based on the comparison distance and the selected likelihood ratio. The signature matching score module 315 can associate the first data signal with a previously identified track associated with the second target object based on the signature matching score. In some examples, the statistical separation between the data points advantageously enables the mapping from the comparison distance to likelihood ratio, thereby removing any assumptions of ambiguous regions before, during, or after the processing and avoiding any combinatorial issues with a larger number of target objects.

The probability density generation module 316 generates a match probability density function based on the comparison distance function and the set of match distances and/or generates a mis-match probability density function based on the comparison distance function and the set of mis-match distances.

The angle selection module 317 determines a data collection angle for a first target profile in the plurality of target profiles and selects a second target profile in the plurality of target profiles based on the data collection angle. For example, the data collection angle for the first target profile is 10°. In this example, the angle selection module 317 selects the second target profile based on the data collection angle of 10° (in this example, the data collection angle of the second target profile is 10°. As another example, the data collection angle for the first target profile is 20° and the angle selection module 317 selects the second target profile with a data collection angle of 30° (e.g., the data collection angle of the second target profile is within the defined range, the data collection angle of the second target profile is the target profile with the closest data collection angle, etc.). The angle selection module 317 determines a data collection angle for the first target profile and selects the second data signal from one or more data signals based on the data collection angle.

The target profile generation module 318 generates the first or the second target profile of the first or the second data signal based on one or more features of the first or the second target object associated with the first or the second data signal.

The input device 391 receives information associated with the signature matching server 310 (e.g., instructions from a user, instructions from another computing device, etc.) from a user (not shown) and/or another computing system (not shown). The input device 391 can include, for example, a keyboard, a scanner, etc. The output device 392 outputs information associated with the signature matching server 310 (e.g., information to a printer (not shown), information to a speaker, etc.).

The display device 393 displays information associated with the signature matching server 310 (e.g., status information, configuration information, etc.). The processor 394 executes the operating system and/or any other computer executable instructions for the signature matching server 310 (e.g., executes applications, etc.).

The storage device 395 stores the set of comparison ratios determined from the set of comparison distances as a set of comparison likelihood ratios. In some examples, the comparison ratio is indicative of a likelihood of a match or mismatch between the two target profiles. The storage device 395 can store information and/or any other data associated with the signature matching server 310. The storage device 395 can include a plurality of storage devices and/or the signature matching server 310 can include a plurality of storage devices (e.g., a ratio storage device, a target profile storage device, etc.). The storage device 395 can include, for example, long-term storage (e.g., a hard drive, a tape storage device, flash memory, etc.), short-term storage (e.g., a random access memory, a graphics memory, etc.), and/or any other type of computer readable storage.

Figure 4:
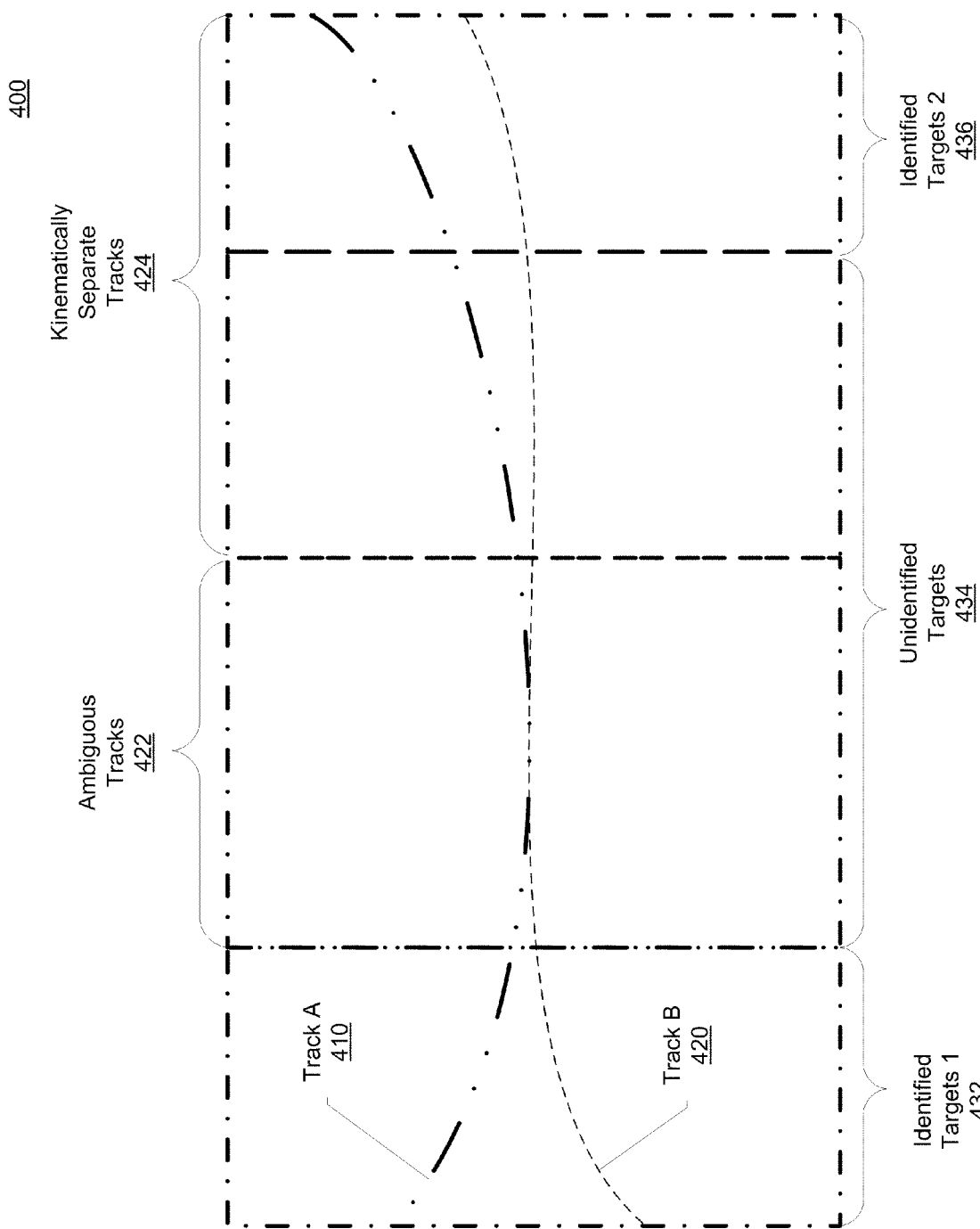
FIG. 4 is a diagram of two tracks identified by the exemplary radar tracking system.

FIG. 4 is a diagram 400 of two tracks identified by the exemplary radar tracking system 100 of FIG. 1. The diagram 400 illustrates track A (410) and track B (420). The tracking server 120 cannot separate the tracks A (410) and B (420) when the tracks are close together (e.g., within ten meters of each other, indistinguishable within the data signals, etc.), i.e., the tracks (422) are ambiguous. The tracking server 120 can identify targets 1 (432) and 2 (436), since the tracks are kinematically separate 424.

In some examples, the signature matching server 125 determines a signature matching score between the tracks A (410) and B (420) at different points in time (e.g., +2 seconds, +3 seconds, etc.) to associate the tracks with each other pre-ambiguity, i.e., the identified targets 1 (432), and post-ambiguity, i.e., the identified targets 2 (436). The tracking server 120 can utilize the signature matching score to associate the tracks together. For example, track A (410) corresponds with a tank moving through a forest and track B (420) corresponds with a truck moving through a forest. In this example, the tank and the truck were traveling next to each other during the ambiguous tracks (422) part of the diagram 400.

Figure 5A:
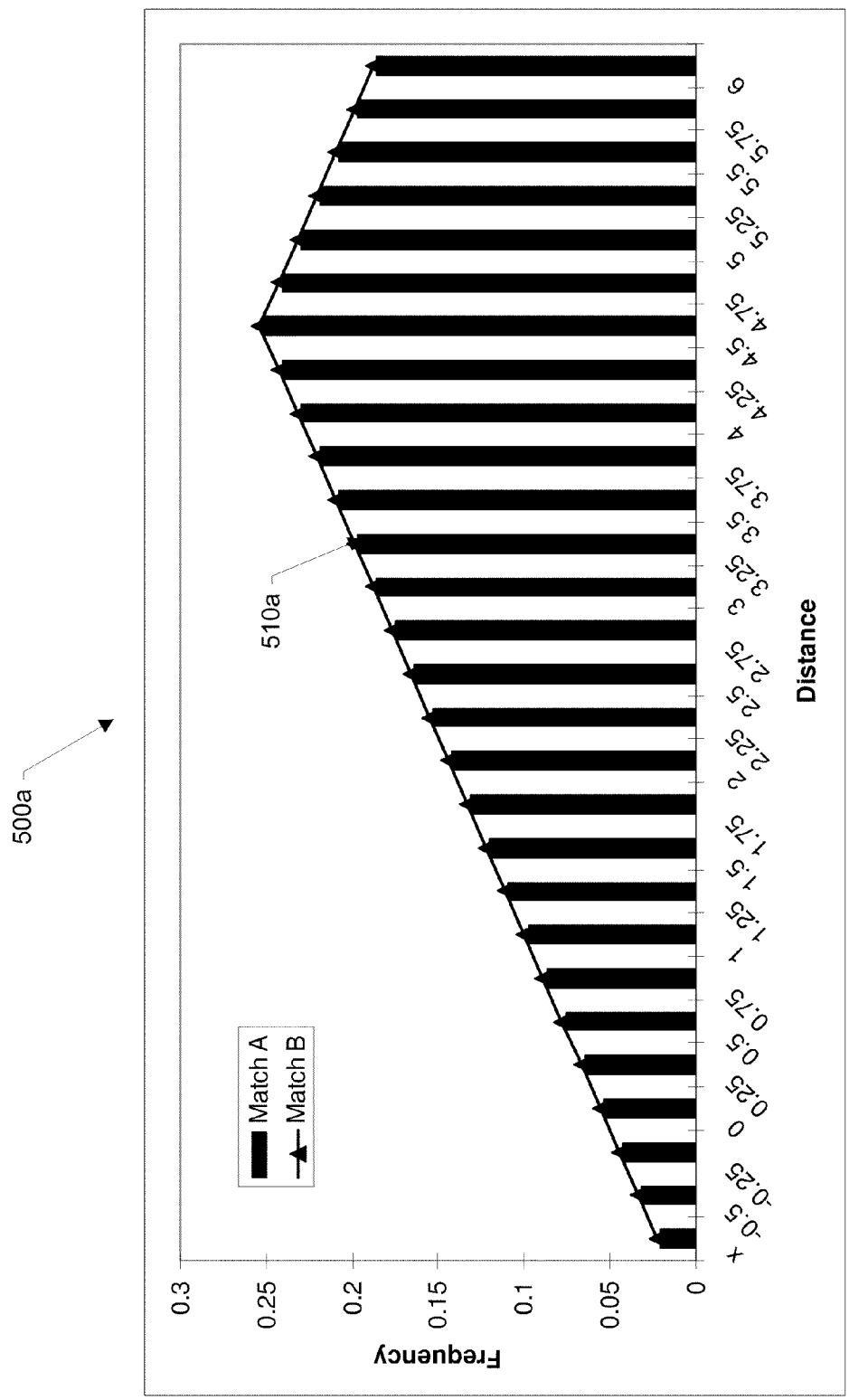
FIGS. 5A-5C are graphs of exemplary target profiles.

FIG. 5A is a graph 500a of a comparison of two exemplary target profiles. The graph 500a illustrates a match between the two target profiles. The distance comparison module 314 of FIG. 3 generates a comparison distance utilizing a comparison distance function and based on a comparison of one or more data points associated with the first target profile and one or more data points associated with the second target profile. For example, the distance comparison module 314 compares the data points between the target profiles—at distances −0.5, −0.25, 0, 0.25, etc. The distance comparison module 314 can advantageously utilize the distance metric between the data points to quickly determine a comparison between the target profiles, thereby lowering the computation load at run-time by utilizing a simple distance metric and allowing use with noisy, low fidelity data.

Table 3 illustrates the comparison of the data points at the distances illustrated in the graph 500*a*. As another example, the distance comparison module 314 compares the data points at distance 3.5, 510*a*—frequency 0.197 to 0.199. The comparison of the data point can be, for example, summed and the summation, the absolute value of the summation, and/or the logarithm of the summation can be utilized for the look-up of the corresponding signature matching score via the previously off-line processed target profiles. The off-line processed target profiles, as described herein, can include off-line comparisons of target profiles and the corresponding matching scores for each comparison. In other examples, the summation, the absolute value of the summation, and/or the logarithm of the summation can be utilized as the signature matching score.

TABLE 3

Data Points and Comparison for Graph 500a

| Distance | Match A | Match B | Comparison |
|---|---|---|---|
| −0.5 | 0.021 | 0.023 | −0.002 |
| −0.25 | 0.032 | 0.034 | −0.002 |
| 0 | 0.043 | 0.045 | −0.002 |
| 0.25 | 0.054 | 0.056 | −0.002 |
| 0.5 | 0.065 | 0.067 | −0.002 |
| 0.75 | 0.076 | 0.078 | −0.002 |
| 1 | 0.087 | 0.089 | −0.002 |
| 1.25 | 0.098 | 0.1 | −0.002 |
| 1.5 | 0.109 | 0.111 | −0.002 |
| 1.75 | 0.12 | 0.122 | −0.002 |
| 2 | 0.131 | 0.133 | −0.002 |
| 2.25 | 0.142 | 0.144 | −0.002 |
| 2.5 | 0.153 | 0.155 | −0.002 |
| 2.75 | 0.164 | 0.166 | −0.002 |
| 3 | 0.175 | 0.177 | −0.002 |
| 3.25 | 0.186 | 0.188 | −0.002 |
| 3.5 | 0.197 | 0.199 | −0.002 |
| 3.75 | 0.208 | 0.21 | −0.002 |
| 4 | 0.219 | 0.221 | −0.002 |
| 4.25 | 0.23 | 0.232 | −0.002 |
| 4.5 | 0.241 | 0.243 | −0.002 |
| 4.75 | 0.252 | 0.254 | −0.002 |
| 5 | 0.241 | 0.243 | −0.002 |
| 5.25 | 0.23 | 0.232 | −0.002 |
| 5.5 | 0.219 | 0.221 | −0.002 |
| 5.75 | 0.208 | 0.21 | −0.002 |
| 6 | 0.197 | 0.199 | −0.002 |
| 6.25 | 0.186 | 0.188 | −0.002 |
| | Total: | | −0.056 |
| | Absolute Value | | 0.056 |
| | Logarithm | | −1.25 |

Figure 5B:
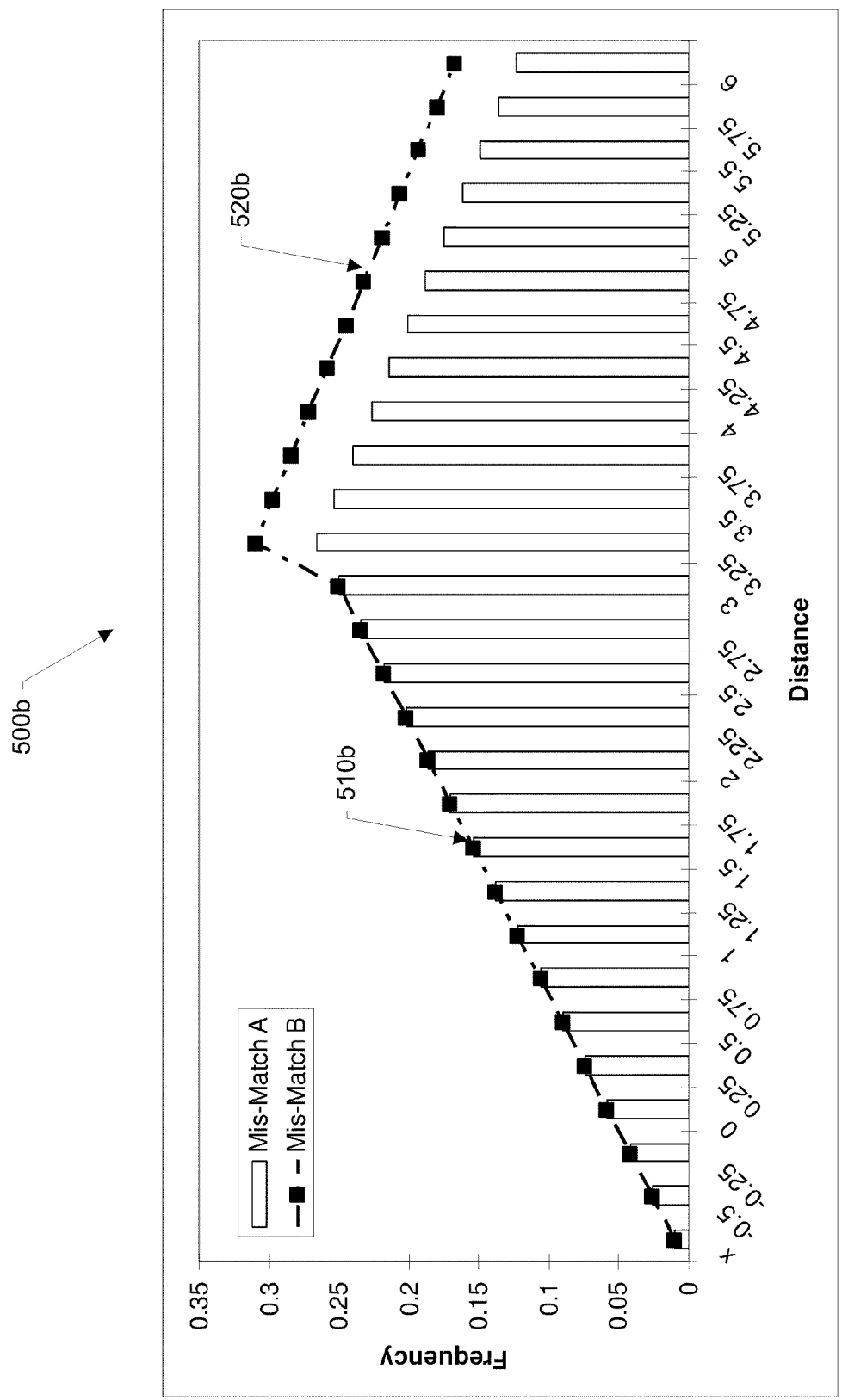

FIG. 5B is a graph 500*b* of a comparison of two exemplary target profiles. The graph 500*b* illustrates a mis-match between the two target profiles. Table 4 illustrates the comparison of the data points at the distances illustrated in the graph 500*b*. The comparison of the data point can be, for example, summed and the summation, the absolute value of the summation, and/or the logarithm of the summation can be utilized for the look-up of the corresponding signature matching score via the previously off-line processed target profiles. In other examples, the summation, the absolute value of the summation, and/or the logarithm of the summation can be utilized as the signature matching score.

TABLE 4

Data Points and Comparison for Graph 500b

| Distance | Mis-Match A | Mis-Match B | Comparison |
|---|---|---|---|
| −0.5 | 0.01 | 0.01 | 0 |
| −0.25 | 0.026 | 0.026 | 0 |
| 0 | 0.042 | 0.042 | 0 |
| 0.25 | 0.058 | 0.058 | 0 |
| 0.5 | 0.074 | 0.074 | 0 |
| 0.75 | 0.09 | 0.09 | 0 |
| 1 | 0.106 | 0.106 | 0 |
| 1.25 | 0.122 | 0.122 | 0 |
| 1.5 | 0.138 | 0.138 | 0 |
| 1.75 | 0.154 | 0.154 | 0 |
| 2 | 0.17 | 0.17 | 0 |
| 2.25 | 0.186 | 0.186 | 0 |
| 2.5 | 0.202 | 0.202 | 0 |
| 2.75 | 0.218 | 0.218 | 0 |
| 3 | 0.234 | 0.234 | 0 |
| 3.25 | 0.25 | 0.25 | 0 |
| 3.5 | 0.266 | 0.31 | −0.044 |
| 3.75 | 0.253 | 0.297 | −0.044 |
| 4 | 0.24 | 0.284 | −0.044 |
| 4.25 | 0.227 | 0.271 | −0.044 |
| 4.5 | 0.214 | 0.258 | −0.044 |
| 4.75 | 0.201 | 0.245 | −0.044 |
| 5 | 0.188 | 0.232 | −0.044 |
| 5.25 | 0.175 | 0.219 | −0.044 |
| 5.5 | 0.162 | 0.206 | −0.044 |
| 5.75 | 0.149 | 0.193 | −0.044 |
| 6 | 0.136 | 0.18 | −0.044 |
| 6.25 | 0.123 | 0.167 | −0.044 |
| | Total: | | −0.528 |
| | Absolute Value | | 0.528 |
| | Logarithm | | −0.277 |

Figure 5C:
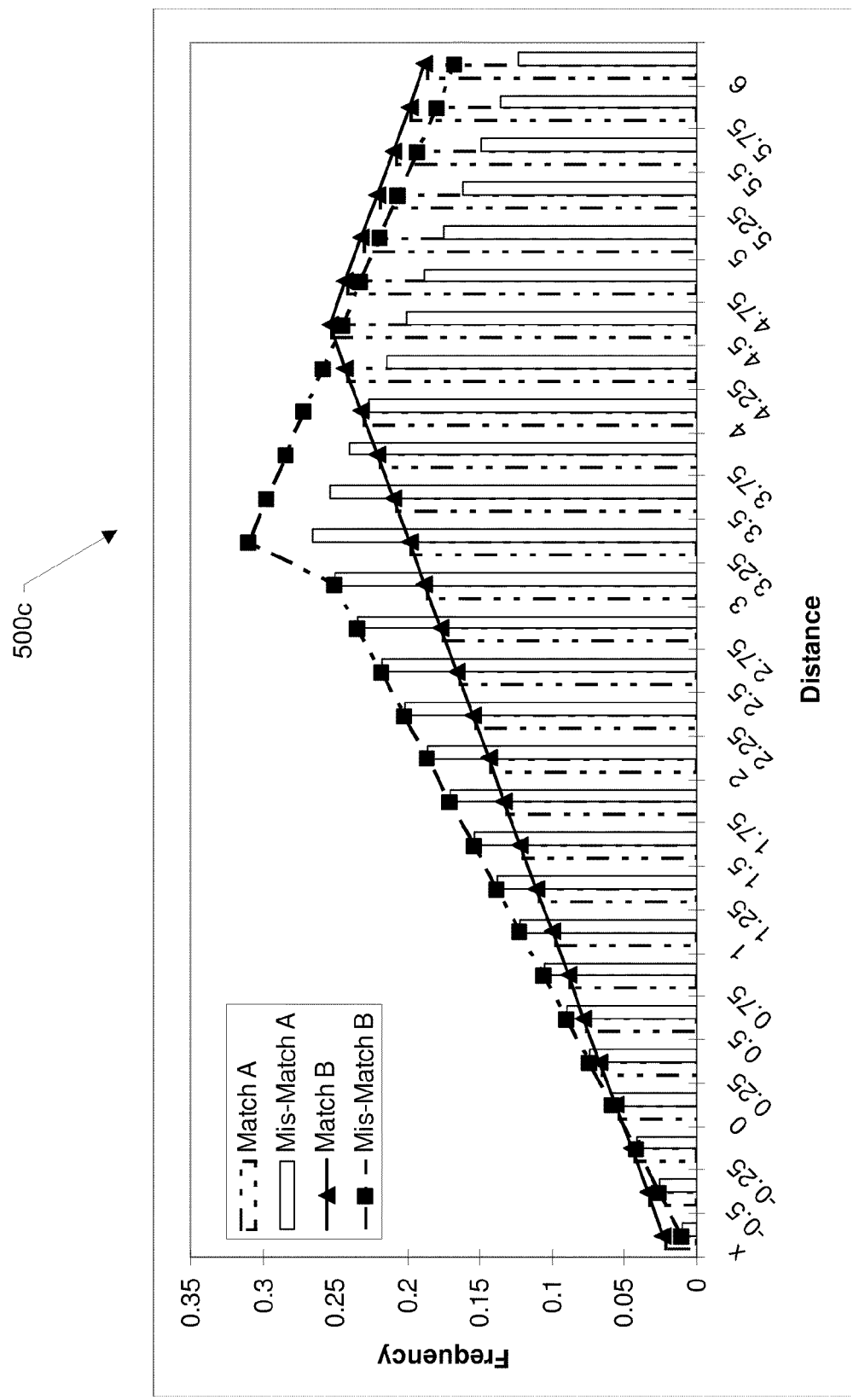

FIG. 5C is a graph 500*c* of a comparison of four exemplary target profiles. The graph 500*c* illustrates a match and a mis-match between the four target profiles. Table 5 illustrates the comparison of the data points at the distances illustrated in the graph 500*c*.

TABLE 5

Data Points and Comparison for Graph 500c

| Distance | Match A | Match B | Match Comparison | Mis-Match A | Mis-Match B | Mis-Match Comparison |
|---|---|---|---|---|---|---|
| −0.5 | 0.021 | 0.023 | −0.002 | 0.01 | 0.01 | 0 |
| −0.25 | 0.032 | 0.034 | −0.002 | 0.026 | 0.026 | 0 |
| 0 | 0.043 | 0.045 | −0.002 | 0.042 | 0.042 | 0 |
| 0.25 | 0.054 | 0.056 | −0.002 | 0.058 | 0.058 | 0 |
| 0.5 | 0.065 | 0.067 | −0.002 | 0.074 | 0.074 | 0 |
| 0.75 | 0.076 | 0.078 | −0.002 | 0.09 | 0.09 | 0 |
| 1 | 0.087 | 0.089 | −0.002 | 0.106 | 0.106 | 0 |
| 1.25 | 0.098 | 0.1 | −0.002 | 0.122 | 0.122 | 0 |
| 1.5 | 0.109 | 0.111 | −0.002 | 0.138 | 0.138 | 0 |
| 1.75 | 0.12 | 0.122 | −0.002 | 0.154 | 0.154 | 0 |
| 2 | 0.131 | 0.133 | −0.002 | 0.17 | 0.17 | 0 |
| 2.25 | 0.142 | 0.144 | −0.002 | 0.186 | 0.186 | 0 |
| 2.5 | 0.153 | 0.155 | −0.002 | 0.202 | 0.202 | 0 |
| 2.75 | 0.164 | 0.166 | −0.002 | 0.218 | 0.218 | 0 |
| 3 | 0.175 | 0.177 | −0.002 | 0.234 | 0.234 | 0 |
| 3.25 | 0.186 | 0.188 | −0.002 | 0.25 | 0.25 | 0 |
| 3.5 | 0.197 | 0.199 | −0.002 | 0.266 | 0.31 | −0.044 |
| 3.75 | 0.208 | 0.21 | −0.002 | 0.253 | 0.297 | −0.044 |
| 4 | 0.219 | 0.221 | −0.002 | 0.24 | 0.284 | −0.044 |
| 4.25 | 0.23 | 0.232 | −0.002 | 0.227 | 0.271 | −0.044 |
| 4.5 | 0.241 | 0.243 | −0.002 | 0.214 | 0.258 | −0.044 |
| 4.75 | 0.252 | 0.254 | −0.002 | 0.201 | 0.245 | −0.044 |
| 5 | 0.241 | 0.243 | −0.002 | 0.188 | 0.232 | −0.044 |
| 5.25 | 0.23 | 0.232 | −0.002 | 0.175 | 0.219 | −0.044 |
| 5.5 | 0.219 | 0.221 | −0.002 | 0.162 | 0.206 | −0.044 |
| 5.75 | 0.208 | 0.21 | −0.002 | 0.149 | 0.193 | −0.044 |
| 6 | 0.197 | 0.199 | −0.002 | 0.136 | 0.18 | −0.044 |
| 6.25 | 0.186 | 0.188 | −0.002 | 0.123 | 0.167 | −0.044 |

Figure 6:
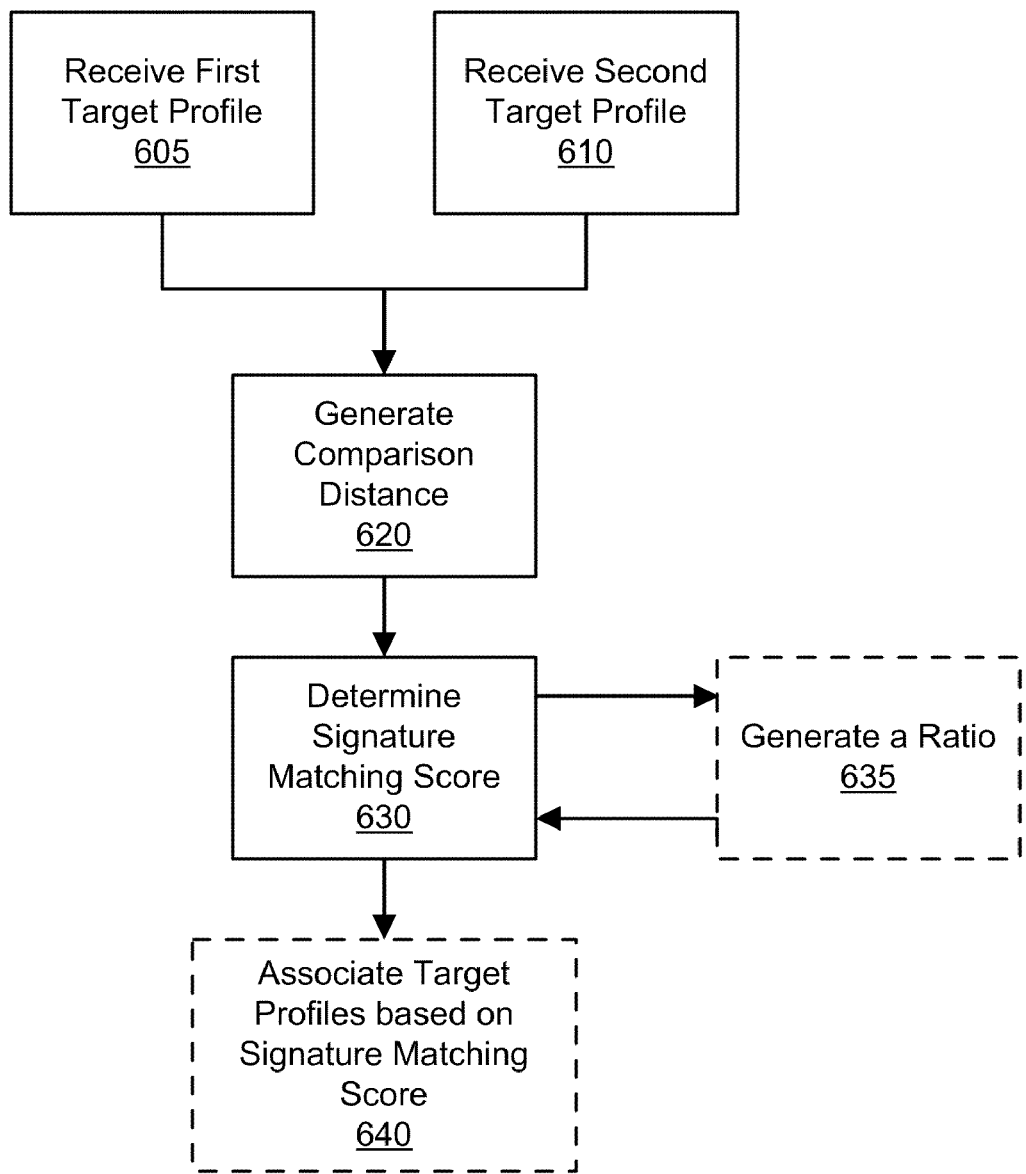
FIG. 6 is a flowchart of an exemplary signature matching method.

FIG. 6 is a flowchart 600 of an exemplary signature matching method utilizing, for example, the signature matching server 300 of FIG. 3. The communication module 311 receives (605) a first target profile associated with a first data signal. The communication module 311 receives (610) a second target profile associated with a second data signal. The distance comparison module 314 generates (620) a comparison distance utilizing a comparison distance function and based on a comparison of one or more data points associated with the first target profile and one or more data points associated with the second target profile. The signature matching score module 315 determines (630) a signature matching score based on the comparison distance.

In some examples, the signature matching score module 315 generates (635) a ratio based on the comparison distance function. In other examples, the signature matching score module 315 associates (640) the first data signal with a previously identified track associated with the second target object based on the signature matching score (e.g., a track of a tank traveling through a forest, a track of a truck traveling through a desert, etc.).

In some examples, the distance comparison module 314 generates (620) the comparison distance based on the comparison of one or more data points associated with the first target profile and one or more data points associated with the second target profile in accordance with equation 1:

$$d_0 = d(P_1, P_2) \qquad \text{Equation 1}$$

$P_1$ is a target profile that includes one or more data points;
$P_2$ is another target profile that includes one or more data points;
d is the function of comparing the data points of the target profiles; and
$d_0$ is the comparison distance.

The signature matching score module 315 determines (630) a signature matching score based on the comparison distance in accordance with equation 2:

$$LR_0 = LR(D_0) \qquad \text{Equation 2}$$

$d_0$ is the comparison distance;
LR is a logarithm; and
$LR_0$ is the signature matching score.

Figure 7:
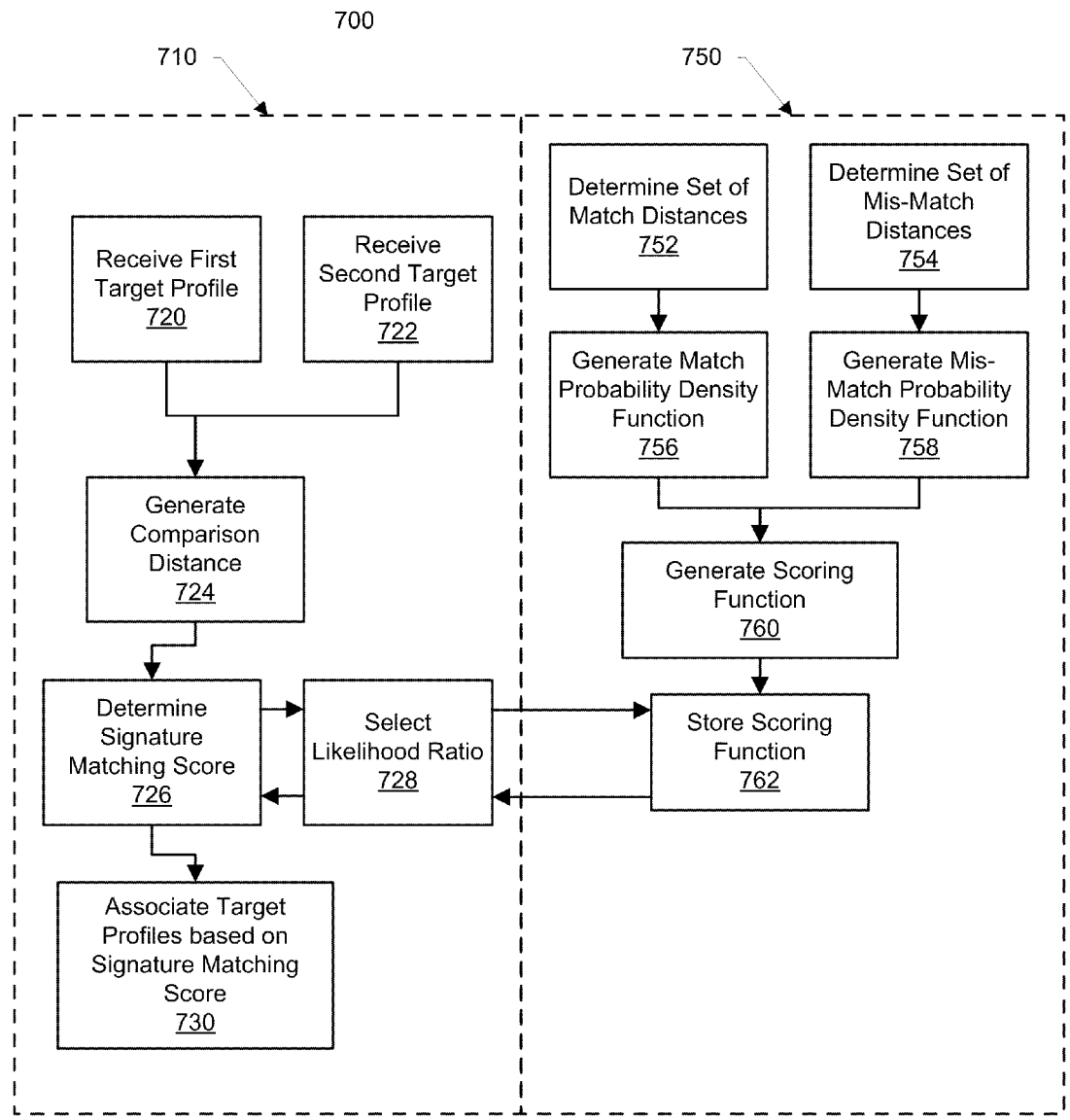
FIG. 7 is another flowchart of an exemplary signature matching method.

FIG. 7 is a flowchart 700 of an exemplary signature matching method utilizing, for example, the signature matching server 300 of FIG. 3. The flowchart 700 includes real-time processing 710 and off-line processing 750.

During the real-time processing 710, the communication module 311 receives (720) a first target profile associated with a first data signal. The communication module 311 receives (722) a second target profile associated with a second data signal. The distance comparison module 314 generates (724) a comparison distance utilizing a comparison distance function and based on a comparison of one or more data points associated with the first target profile and one or more data points associated with the second target profile. The signature matching score module 315 determines (726) a signature matching score based on the comparison distance. The signature matching score module 315 selects (728) a likelihood ratio based on the comparison distance. The signature matching score module 315 associates (730) the first data signal with a previously identified track associated with the second target object based on the signature matching score.

During the off-line processing 750, the distance comparison module 314 determines (752) a set of match distances between two target profiles in a plurality of target profiles and determines (754) a set of mis-match distances between the two target profiles (e.g., a pairing of target profiles for "similar" target objects, a pairing of target profiles for "different"

target objects, etc.). The probability density generation module 316 generates (756) a match probability density function based on the comparison distance function and the set of match distances and generates (758) a mis-match probability density function based on the comparison distance function and the set of mis-match distances. The distance comparison module 314 generates (760) a scoring function based on the match probability density function and the mis-match probability density function. The storage device 395 stores (762) the scoring function (e.g., a look-up table of the stored distances and likelihood results). In some examples, the scoring function is indicative of a likelihood of a match or mis-match between the two target profiles.

In some examples, the signature matching score module 315 selects (728) a likelihood ratio based on the comparison distance from one or more stored likelihood ratios. Table 6 illustrates a look-up table of a likelihood ratio from a plurality of stored likelihood ratios. The signature matching score module 315 can select the stored distance that matches the comparison distance (in this example, 0.4324523) and utilized the likelihood result that corresponds to the stored distance (in this example, +32.32).

TABLE 6

Look-Up Table of Likelihood Results

| Comparison Distance | Stored Distance | Likelihood Result | Selected |
|---|---|---|---|
| 0.4324523 | 0.4324513 | 0.0 | No |
| 0.4324523 | 0.52432 | +0.6 | No |
| 0.4324523 | 0.0907 | −2.3 | No |
| 0.4324523 | 0.8911324 | −0.42 | No |
| 0.4324523 | 0.32475143 | −0.43 | No |
| 0.4324523 | 0.3246145 | −0.4 | No |
| 0.4324523 | 132.3214 | −324.23 | No |
| 0.4324523 | 23.231 | −56.54 | No |
| 0.4324523 | 12385.3214 | −3252.32 | No |
| 0.4324523 | 8.51435 | −32.23 | No |
| 0.4324523 | 0.0001324 | +3.44 | No |
| 0.4324523 | 0.4324523 | +32.32 | Yes |
| 0.4324523 | 23.23 | −23.23 | No |

In some examples, the target profile generation module 318 defines a set of target profiles for target object t as set forth below.

For target objects t=1, ..., $n_{targets}$, $P_t$ define a set of target profiles for target object t, so that $P_t(n)$ represents the nth target profile for target object t.

In other examples, the distance comparison module 314 defines an observable characteristic of the target profile as set forth below.

Define o: $P_t \rightarrow \Re$ as an observable characteristic of the target profile (e.g., collected azimuth angle)

In some examples, the distance comparison module 314 defines an external distance metric of the target profiles as set forth below.

Define $\hat{d}$: $o(P_{t_1}) \times o(P_{t_2}) \rightarrow \Re$ as an external distance metric on target profiles depending only upon observable characteristics of target profiles (e.g., the absolute distance in collected azimuth angle of two profiles)

In other examples, the distance comparison module 314 defines a heuristic internal distance metric on the target profiles as set forth below.

Define d: $P_{t_1} \times P_{t_2} \rightarrow \Re$ as an heuristic internal distance metric on target profiles (e.g., Mean Squared Error (MSE))

In some examples, the distance comparison module 314 determines a set of match distances between two target profiles in a plurality of target profiles utilizing the equation as set forth below.

Set of match distances are defined by $$\sum = \left\{ \begin{array}{l} d(P_{t_1}(n_1), P_{t_2}(n_2)) \mid t_1 = t_2 \text{ and} \\ \hat{d}(o(P_{t_1}(n_1)), o(P_{t_1}(n_1))) < \varepsilon \end{array} \right\}$$

That is the set of distance between profiles from the same target, that are close in collected azimuth.

In other examples, the distance comparison module 314 determines a set of mis-match distances between the two target profiles utilizing the equation as set forth below.

Set of mismatch distances are defined by $$\Delta = \left\{ \begin{array}{l} d(P_{t_1}(n_1), P_{t_2}(n_2)) \mid t_1 \neq t_2 \text{ and} \\ \hat{d}(o(P_{t_1}(n_1)), o(P_{t_1}(n_1))) < \varepsilon \end{array} \right\}$$

That is the set of distance between profiles from the different targets, that are close in collected azimuth.

In some examples, the probability density generation module 316 generates a match probability density function based on the comparison distance and the set of match distances utilizing the equation as set forth below. The probability density generation module 316 further generates a mis-match probability density function based on the comparison distance and the set of mis-match distances utilizing the equation as set forth below. The probability density generation module 316 can utilize a histogram, a kernel density estimation, and/or similar technique.

Generate two probability density functions $g_\Sigma$ and $g_\Delta$ from the sets of same and different distances (e.g., utilizing histograms, kernel density estimation, and/or similar technique)

In other examples, the distance comparison module 314 generates a likelihood ratio based on the match probability density function and the mis-match probability density function utilizing the equation as set forth.

Generate the likelihood ratio $$LR: \Re \rightarrow \Re \text{ by}$$

$$LR(d) = \frac{g_\Sigma(d)}{g_\Delta(d)}$$

In some examples, the target profile is a high range resolution (HRR) profile on a moving ground target. The target profile can be, for example, associated with a military and/or civilian ground vehicle. The technology can be, for example, incorporated into a feature-aided tracking system in conjunction with a multiple hypothesis tracker (MHT). In other examples, the technology can be utilized for quality checking and/or other uses. In some examples, the target profiles can include: a collapsed synthetic aperture radar (SAR), a hyperspectral profile, a multi-spectral profile, a time domain signals intelligence, an audio stream, a vibrational data, a light data, and/or other 1-D time and frequency profile (e.g., 2-D feature sets that are recast into 1-D form, 1-D feature sets, etc.).

The technology can utilize, for example, similarities and/or differences between target profiles and measures the degree of similarity and/or differences relative to a mapping from a distance to a likelihood that is based on the world-view of matching. This mapping, which is specific to the world-view, can be, for example, defined by a priori computations based on a large number of target profiles from disparate targets under disparate conditions. The priori description of how the world-view works in terms of what the expected differences between similar and different targets can be, for example, in terms of the distance comparison function that is utilized. In this example, the mapping from distance to likelihood does not depend on the specific sets of target objects in the scenario. The distance to likelihood mapping can, for example, depend on the definition of the world-view, which in turn depends on the purpose of the feature matching application.

For example, one world-view might be to be able to tell the difference between civilian and military vehicles. In that case, the dataset used to build up the mapping function would be a large set of civilian and military profiles, in which all civilian profiles would be considered to be from the "same" target object while and all military profiles would be considered to be from the "same" target object. A civilian profile would be considered different from a military profile, however. In another example of a world-view, the definition of what is the "same" and what is "different" can be stricter, so that a target profile of a "Toyota Corolla" would be different from a target profile of a "Honda Civic."

In some examples, the data signal and/or the target profile is pre-processed. The pre-processing can, for example, occur before the communication module receives the target profile and/or before the distance comparison module generates the comparison distance. The pre-processing can, for example, include noise subtraction, active region extraction, gain compensation, error calculation, noise check, noise crop, quantization filtering, median filtering, and/or any other type of signal processing.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by special purpose logic circuitry and/or an apparatus can be implemented on special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from, and/or can transfer data to one or more mass storage devices for storing data (e.g., magnetic, magneto-optical disks, optical disks, etc.).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for signature matching, the method comprising:
   receiving, via one or more processors, a first target profile associated with a first data signal, the first data signal associated with a first target object;
   receiving, via the one or more processors, a second target profile associated with a second data signal, the second data signal associated with the first target object or a second target object;
   generating, via the one or more processors, a comparison distance utilizing a comparison distance function and based on a comparison of one or more data points associated with the first target profile and one or more data points associated with the second target profile;
   determining, via the one or more processors, a signature matching score based on the comparison distance, wherein determining the signature matching score further comprises:
     generating a ratio based on the comparison distance,
     selecting a likelihood ratio based on the ratio determined from the comparison distance, wherein the likelihood ratio associated with a match probability density function and a mis-match probability density function, and
     wherein the determining the signature matching score based on the comparison distance further comprising determining the signature matching score based on the comparison distance and the selected likelihood ratio.

2. The method of claim 1, wherein the selected likelihood ratio is calculated in accordance with equation:

$$LR(d) = \frac{g_\Sigma(d)}{g_\Delta(d)}$$

wherein:
$g_\Sigma$ is the match probability density function indicative of a match of the first target profile and the second target profile,
$g_\Delta$ is a mis-match probability density function indicative of a mis-match of the first target profile and the second target profile,
d is the comparison distance, and
LR is the likelihood ratio.

3. The method of claim 1, further comprising:
   for each set of two target profiles in a plurality of target profiles,
     determining, via the one or more processors, a set of match distances between the two target profiles,
     generating, via the one or more processors, a match probability density function based on the comparison distance function and the set of match distances;
     determining, via the one or more processors, a set of mis-match distances between the two target profiles;
     generating, via the one or more processors, a mis-match probability density function based on the comparison distance function and the set of mis-match distances;
     generating, via the one or more processors, a scoring function based on the match probability density function and the mis-match probability density function, and
     storing, via the one or more processors, the scoring function as a set of comparison likelihood ratios, the comparison ratio being indicative of a likelihood of a match or mis-match between the two target profiles.

4. The method of claim 3, further comprising:
   determining, via the one or more processors, a data collection angle for a first target profile in the plurality of target profiles; and
   selecting a second target profile in the plurality of target profiles based on the data collection angle.

5. The method of claim 3, further comprising generating the match probability density function based on at least a histogram, a kernel density estimation, or any combination thereof.

6. The method of claim 1, further comprising generating, via the one or more processors, the first or the second target profile of the first or the second data signal based on one or more features of the first or the second target object associated with the first or the second data signal.

7. The method of claim 1, further comprising associating, via the one or more processors, the first data signal with a previously identified track associated with the second target object based on the signature matching score.

8. The method of claim 1, further comprising:
   determining, via the one or more processors, a data collection angle for the first target profile; and
   selecting the second data signal from one or more data signals based on the data collection angle.

9. A computer program product for execution by a processor, the computer program product tangibly embodied in an information carrier comprising a machine-readable storage device, the computer program product including instructions being operable to cause a data processing apparatus to:
   receive a first target profile associated with a first data signal, the first data signal associated with a first target object;
   receive a second target profile associated with a second data signal, the second data signal associated with the first target object or a second target object;
   generate a comparison distance utilizing a comparison distance function and based on a comparison of one or more data points associated with the first target profile and one or more data points associated with the second target profile; and
   determine a signature matching score based on the comparison distance, wherein determining the signature matching score further comprises:
     generating a ratio based on the comparison distance,
     selecting a likelihood ratio based on the ratio determined from the comparison distance, wherein the likelihood ratio associated with a match probability density function and a mis-match probability density function, wherein the determining the signature matching score based on the comparison distance further comprising determining the signature matching score based on the comparison distance and the selected likelihood ratio.

10. A system for signature matching, the system comprising:
a communication module configured to:
receive a first target profile associated with a first data signal, the first data signal associated with a first target object, and
receive a second target profile associated with a second data signal, the second data signal associated with the first target object or a second target object;
a distance comparison module configured to generate a comparison distance utilizing a comparison distance function and based on a comparison of one or more data points associated with the first target profile and one or more data points associated with the second target profile;
a signature matching score module configured to determine a signature matching score based on the comparison distance, wherein the signature matching score module is further configured to generate a ratio based on the comparison distance function; and
a likelihood ratio generation module configured to select a likelihood ratio based on the ratio determined from the comparison distance, wherein the likelihood ratio associated with a match probability density function and a mis-match probability density function,
wherein the signature matching score module further configured to determine the signature matching score based on the comparison distance function and the selected likelihood ratio.

11. The system of claim 10 wherein the first data signal comprising a first high range resolution radar data signal, the first target object associated with a first ground track, and the second data signal comprising a second high range resolution radar data signal.

12. The system of claim 10, wherein the signature matching score being indicative of a match or mis-match between the first target profile and the second target profile.

13. The system of claim 10, further comprising:
a distance comparison module configured to:
determine a set of match distances between two target profiles in a plurality of target profiles;
determine a set of mis-match distances between the two target profiles;
a probability density generation module configured to:
generate a match probability density function based on the comparison distance function and the set of match distances;
generate a mis-match probability density function based on the comparison distance function and the set of mis-match distances;
the distance comparison module further configured to generate a scoring function based on the match probability density function and the mis-match probability density function, and
a storage device configured to store the scoring function as a set of comparison likelihood ratios, the comparison ratio being indicative of a likelihood of a match or mis-match between the two target profiles.

14. The system of claim 13 further comprising:
an angle selection module configured to:
determine a data collection angle for a first target profile in the plurality of target profiles; and
select a second target profile in the plurality of target profiles based on the data collection angle.

15. The system of claim 10 further comprising:
a target profile generation module configured to generate the first or the second target profile of the first or the second data signal based on one or more features of the first or the second target object associated with the first or the second data signal.

16. The system of claim 10, further comprising:
the signature matching score module configured to associate the first data signal with a previously identified track associated with the second target object based on the signature matching score.

17. The system of claim 10, further comprising:
an angle selection module configured to:
determine a data collection angle for the first target profile; and
select the second data signal from one or more data signals based on the data collection angle.

18. A system for signature matching, the system comprising:
means for receiving a first target profile associated with a first data signal, the first data signal associated with a first target object;
means for receiving a second target profile associated with a second data signal, the second data signal associated with the first target object or a second target object;
means for generating a comparison distance utilizing a comparison distance function and based on a comparison of one or more data points associated with the first target profile and one or more data points associated with the second target profile; and
means for determining a signature matching score based on the comparison distance, wherein determining the signature matching score further comprises:
generating a ratio based on the comparison distance,
selecting a likelihood ratio based on the ratio determined from the comparison distance, wherein the likelihood ratio associated with a match probability density function and a mis-match probability density function, and
wherein the determining the signature matching score based on the comparison distance further comprising determining the signature matching score based on the comparison distance and the selected likelihood ratio.

* * * * *